(12) United States Patent
Guynes et al.

(10) Patent No.: US 11,474,693 B2
(45) Date of Patent: Oct. 18, 2022

(54) OSDS FOR DISPLAY DEVICES

(71) Applicant: Hewlett-Packard Development Company, L.P., Spring, TX (US)

(72) Inventors: Timothy Guynes, Spring, TX (US); Syed S. Azam, Spring, TX (US); Gregory Staten, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/262,778

(22) PCT Filed: Jan. 2, 2019

(86) PCT No.: PCT/US2019/012025
§ 371 (c)(1),
(2) Date: Jan. 25, 2021

(87) PCT Pub. No.: WO2020/142093
PCT Pub. Date: Jul. 9, 2020

(65) Prior Publication Data
US 2021/0349629 A1    Nov. 11, 2021

(51) Int. Cl.
*G06F 3/0482* (2013.01)
*G06F 3/0484* (2022.01)
*G06F 3/0488* (2022.01)
*G06F 3/04886* (2022.01)
*G06F 3/0489* (2022.01)

(52) U.S. Cl.
CPC ........ *G06F 3/04886* (2013.01); *G06F 3/0482* (2013.01); *G06F 3/0484* (2013.01); *G06F 3/0489* (2013.01)

(58) Field of Classification Search
None
See application file for complete search history.

(56) References Cited

U.S. PATENT DOCUMENTS

| | | | |
|---|---|---|---|
| 5,404,433 A * | 4/1995 | Hosogai | G06T 11/00 715/209 |
| 6,483,500 B1 * | 11/2002 | Choi | G06F 3/0486 345/184 |
| 6,556,222 B1 * | 4/2003 | Narayanaswami | G04G 9/0064 368/295 |
| 8,593,502 B2 * | 11/2013 | Saleh | G06F 3/041 348/14.03 |
| 9,052,816 B2 * | 6/2015 | Hashimoto | G06F 3/04883 |
| 9,056,244 B2 * | 6/2015 | Lesley | G07F 17/34 |
| 9,176,528 B2 * | 11/2015 | Okuley | G06F 3/1454 |

(Continued)

FOREIGN PATENT DOCUMENTS

CN    202093501 U    12/2011

OTHER PUBLICATIONS

Jaguar, Touch-screen manual, p. 242-249.

(Continued)

*Primary Examiner* — Jordany Nunez
(74) *Attorney, Agent, or Firm* — Fabian VanCott (57) ABSTRACT

A display device may include a processing device; a touch control module to, when executed by the processing device: detect a touch at a bezel of the display device; present a plurality of navigation buttons at a location of the detected touch; and display an on-screen display (OSD) upon detection of the touch.

19 Claims, 6 Drawing Sheets

(56) References Cited

U.S. PATENT DOCUMENTS

| | | | |
|---|---|---|---|
| 10,019,153 B2* | 7/2018 | Kroupa | G06F 3/0483 |
| 10,690,320 B2* | 6/2020 | Steiner | F21V 33/0052 |
| 10,831,355 B2* | 11/2020 | Staggs | G06F 3/04886 |
| 2005/0275637 A1 | 12/2005 | Hinckley et al. | |
| 2007/0075981 A1 | 4/2007 | Hsieh et al. | |
| 2007/0089069 A1* | 4/2007 | Hsieh | G06F 3/03547 |
| | | | 715/810 |
| 2007/0205088 A1* | 9/2007 | Lee | H01H 13/83 |
| | | | 200/314 |
| 2008/0106526 A1 | 5/2008 | Chen | |
| 2009/0251609 A1* | 10/2009 | Almeida | H04N 5/44513 |
| | | | 348/569 |
| 2010/0110019 A1* | 5/2010 | Ozias | G06F 3/03547 |
| | | | 345/173 |
| 2011/0060987 A1 | 3/2011 | Huang | |
| 2011/0205161 A1* | 8/2011 | Myers | G06F 3/0238 |
| | | | 345/169 |
| 2011/0209098 A1* | 8/2011 | Hinckley | G06F 3/04883 |
| | | | 715/863 |
| 2011/0234746 A1* | 9/2011 | Saleh | G06F 3/041 |
| | | | 348/14.03 |
| 2012/0001942 A1 | 1/2012 | Abe | |
| 2012/0200475 A1* | 8/2012 | Baker | H01H 9/181 |
| | | | 345/4 |
| 2013/0027328 A1 | 1/2013 | Pan | |
| 2013/0235271 A1 | 9/2013 | Kasuga et al. | |
| 2014/0073409 A1* | 3/2014 | Lesley | G07F 17/32 |
| | | | 463/25 |
| 2014/0184512 A1* | 7/2014 | Okuley | G06F 1/1643 |
| | | | 345/168 |
| 2014/0223381 A1* | 8/2014 | Huang | G06F 3/04883 |
| | | | 715/863 |
| 2014/0289668 A1* | 9/2014 | Mavrody | G06F 3/04883 |
| | | | 715/781 |
| 2014/0292694 A1 | 10/2014 | Lin et al. | |
| 2014/0306905 A1* | 10/2014 | Kim | G06F 3/04883 |
| | | | 345/173 |
| 2015/0324070 A1* | 11/2015 | Kim | G06F 3/0416 |
| | | | 715/825 |
| 2016/0313842 A1 | 10/2016 | Pacheco et al. | |
| 2016/0320891 A1* | 11/2016 | Mavrody | G06F 1/1643 |
| 2017/0175981 A1* | 6/2017 | Steiner | H01H 13/83 |
| 2018/0157395 A1* | 6/2018 | Mhun | G06F 3/04812 |
| 2019/0243505 A1* | 8/2019 | Lewis | G06F 3/0488 |
| 2019/0384353 A1* | 12/2019 | Azam | G06F 1/1601 |

OTHER PUBLICATIONS

Ricoh, On-screen-display (OSD) controls, retrieved Nov. 21, 2018, 3 pgs, http://info.rpp.ricoh-usa.com/help/index.jsp?topic=%2F com.ibm.printers. ip41 00opg uideyuma%2Fgjopguidedillon32.htm.

\* cited by examiner

OSDS FOR DISPLAY DEVICES

BACKGROUND

Display devices are used to display text and images to a user. In some examples, these display devices may include physical buttons used to access a menu to adjust certain properties of the display device. This input from the physical buttons may be sent to any processor to execute computer readable program code in order present the menu.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Display devices present to a user an image via a screen formed therein. In some examples, the screen of the display devices may include a layer above the display elements of the touch display devices that detects the location on the touchscreen surface that the user touches. A processor may be included within the touch display devices to both process image data to be visually presented to a user as well as touch input received by a user at the touchscreen.

The display device, with or without a touchscreen, may be coupled to a computing device that provides to a processor of the display device data descriptive of images to present to the user. Additionally, the display device may allow a user to interact with the physical characteristics of any image being present via an on-screen display (OSD). An on-screen display (OSD) may be any visual control panel on a touch display device that allows a user to select viewing options and/or adjust components of the display, such as brightness, contrast, and horizontal and vertical positioning, among other characteristics. This OSD may be presented to the user after the actuation of a physical button formed on a bezel around the touch display device. However, as the size of the bezel is decreasing in the industry, the placement of these buttons is placed behind the touch display device or in locations that are aesthetically unappealing or otherwise physically difficult to access.

The present specification describes a display device may include a processing device; a touch control module to, when executed by the processing device: detect a touch at a bezel of the display device; present a plurality of navigation buttons at a location of the detected touch; and display an on-screen display (OSD) upon detection of the touch.

The present specification also describes a method of activating an on-screen display (OSD), that includes with a touch control module executed by a processing device: detecting a touch by a user at a bezel of a display device; presenting a navigation button on the bezel; and presenting the on-screen display (OSD) on a screen of the display device along an edge of the display device closest to that detected touch at the bezel.

The present specification further describes a touch display device, that includes a processing device; a multifunctional touch module to, when executed by the processing device: detect a touch by a user at a bezel surrounding the touch display device; present an on-screen display (OSD) on the touch display device; and wherein the multifunctional touch module disables input to a computing device associated with the touch display device when sensed touches at the OSD are detected.

Figure 1:
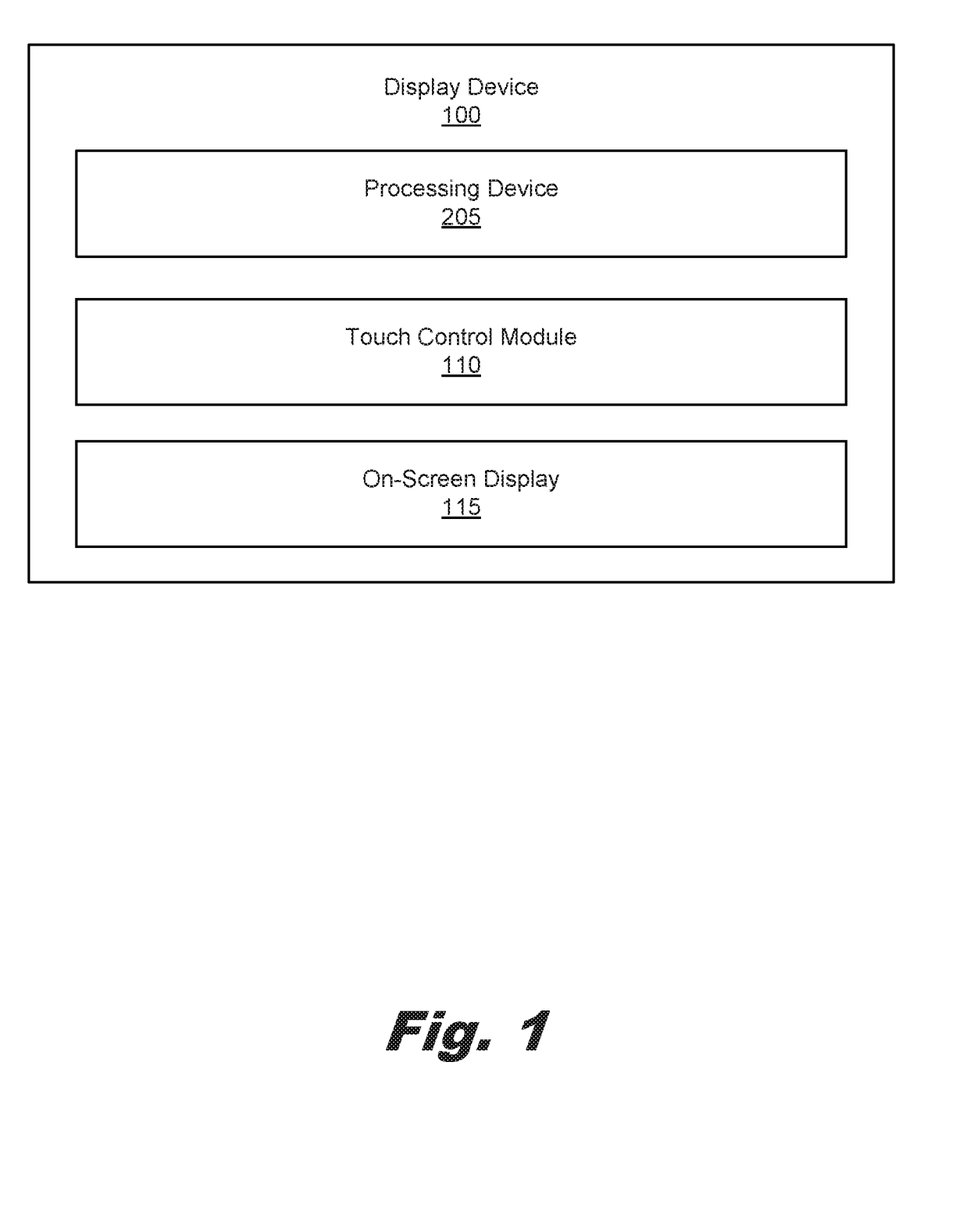
FIG. 1 is a block diagram of a display device according to an example of the principles described herein.

Turning now to the figures, FIG. 1 is a block diagram of a display device (100) according to an example of the principles described herein. The display device (100) may include a processing device (105). As described herein, the processing device (105) may be any type of processing device (105) that may receive input from a user via a bezel of the display device (100) and act on that input by executing computer readable program code. In an example, the processing device (105) may be physically placed within the housing of the display device (100). In an example, the processing device (105) may be communicatively coupled to the display device (100) and physically located at a computing device associated with the display device (100). In an example, the display device (100) may include a processing device (105) and a computing device associated with the display device (100) may also include a processing device (105). In this example, the two processing devices (105) may cooperate in order to accomplish the functionality of the display device (100) as described herein.

The display device (100) may include a touch control module (110). In an example, the touch control module (110) may be computer readable program code that, when executed by the processing device (105), detects a touch by a user at the bezel surrounding the display device (100) and presents an on-screen display (OSD) on the display device. In another example, the touch control module (110) may be in the form of an application specific integrated circuit (ASIC) that is communicatively accessible by the processing device (105).

In any example presented herein, the touch of a user may cause the touch control module (110) to cause the OSD (115) to be displayed along with a number of navigation buttons. In an example, the navigation buttons may appear at the location along the bezel wherein the touch was detected by the touch control module (110). In an example, the touch control module (110) may maps a location of the touch detected at the bezel and place the OSD (115) at a location closest to the bezel where the touch was detected by the touch control module (110).

In an example shown, the OSD may be displayed upon detected of a distinct touch. Again, the distinct touch may be any touch at any surface of the bezel that is distinguishable by the multifunctional touch module (110). The distinct touch may be that which the touch control module (110) interprets to be a request to display the OSD. Such a distinct touch may include a series of timed touches, a plurality of concurrent touches by any number of fingers of the user on the bezel and/or a single touch at the bezel.

The display device (100) may, upon execution of the processing device (105), present an on-screen display (OSD) (115) to a user upon detection of a touch at a bezel of the display device (100). The OSD, as described herein, may include any number of options to adjust the color presented by the display device (100), brightness presented by the display device (100), contrast presented by the display device (100), position of images presented by the display device (100), orientation of image presented by the display device (100), input source to the display device (100), and/or energy saving characteristics of the display device (100), among other options to adjust characteristics of the display device (100).

In an example, the touch at the bezel may cause the touch control module (110) to map the OSD as well as a number of soft keys at or around a location wherein the touch was detected on the bezel. In this example, the touch control module (110) may detect the touch at the bezel and illuminate a portion or surface of the bezel with soft keys representing the navigation buttons described herein. Specific examples of soft keys may include a first direction advancement button, a second direction advancement button, a select button, a back button, a forward button, an exit button or combinations thereof. These navigation keys presented, in an example, as soft keys on the bezel may be used to allow the user to navigate through different options presented on the OSD (115). In another example, the navigation button may be presented on the display surface of the display device (100) along with the OSD (115). In this example, the user may actuate the navigation buttons by touching a portion of the bezel located next to any of the given navigation buttons. In an example, where the display device (100) is a touchscreen display device, the user may simply touch the navigation buttons presented on the touchscreen so as to make a selection as described herein.

Again, the OSD may be presented next to the navigation buttons. This may be done by detecting the location of the touch at the bezel and mapping the OSD closest to that location. This mapping process may be conducted by the touch control module (110) using any executable program code that may define the location of the OSD based an x- and y-coordinates of the screen of the display device (100). As also described herein, options may be provided to the user either via the OSD itself or other processor executable program code to change the position of the OSD once the OSD is initiated. In this example, the user may be allowed to select an option so as to maintain the position of the OSD regardless of where the user touches the bezel in a subsequent touch on the bezel or when a touch is detected at the bezel by the touch control module (110).

In an example, the navigation buttons may include an OSD relocation button. In another example, the OSD (115) may include an OSD relocation button accessible via use of the navigation buttons on the bezel. In either example, the selection of the relocation button or option causes the OSD (115) to be relocated on the display device (100) according to a location on the display device (100) chosen by the user. In this example, the user may also select an option to cause the OSD (115) to appear at that selected location on the display device (100) whenever the OSD (115) is to be presented to the user: i.e., when a touch is subsequently detected at the bezel by the touch control module (110).

In an example, the navigation buttons may include a navigation relocation button. In another example the OSD (115) may include a navigation button relocation option. In either of these examples, the selection of the navigation relocation button or navigation button relocation option may cause, when selected, allows a user to determine where on the bezel the navigation buttons are to appear regardless of the location where the user touches the bezel in a subsequent bezel touch. Again, this may allow a user to personalize the functionality of the display device (100) so as to best fit the user's operation of the display device (100).

Figure 2:
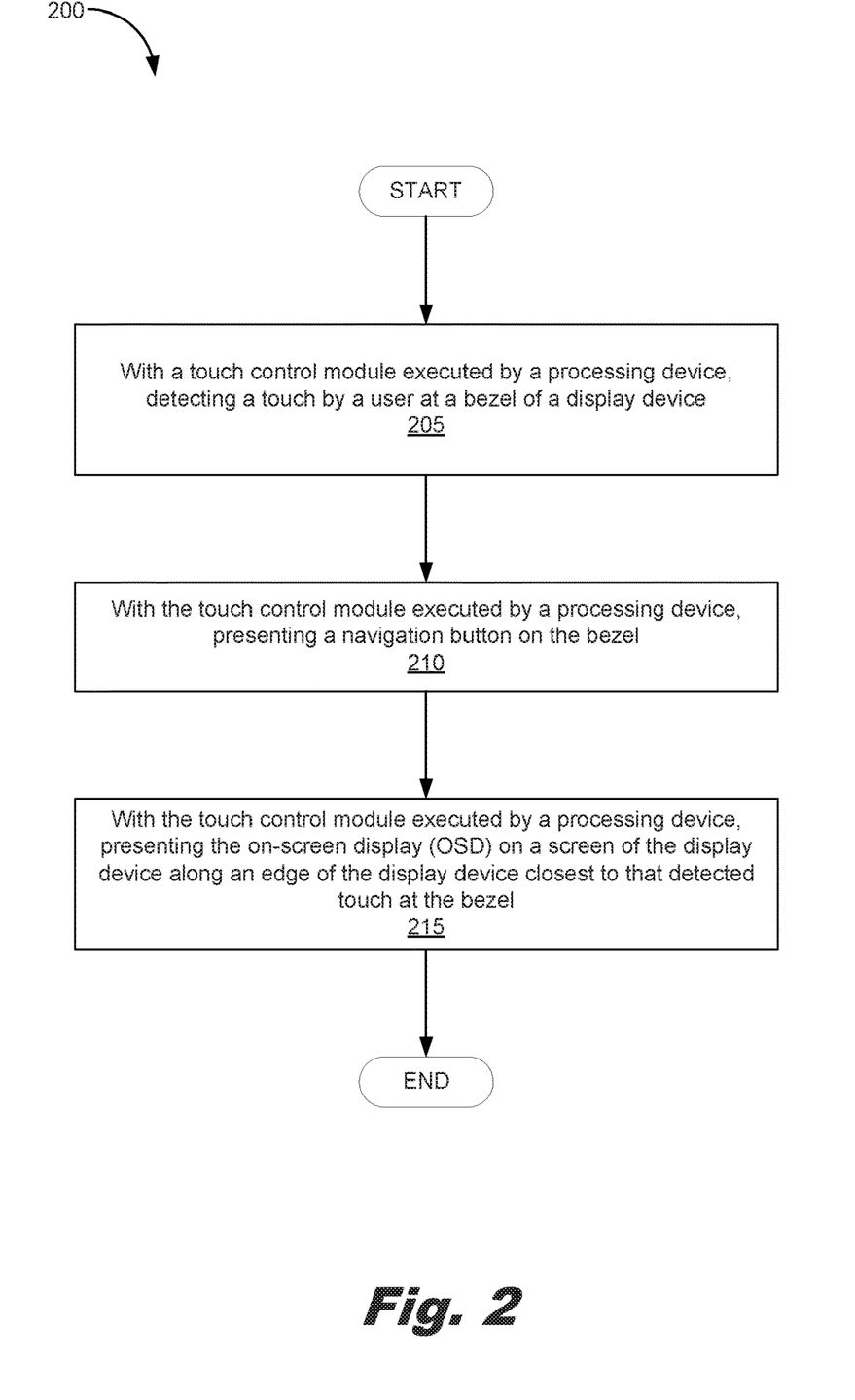
FIG. 2 is a flowchart depicting a method of activating an on-screen display (OSD) according to an example of the principles described herein.

FIG. 2 is a flowchart depicting a method (200) of activating an on-screen display (OSD) according to an example of the principles described herein. The method (200) may include, with a touch control module (110) executed by a processing device (105) detecting a touch by a user at a bezel of a display device (100). In some examples, the touch control module (110) may detect the touch at the bezel. In another example, the touch control module (110) may detect the touch directly on the surface of the touch display device (100) using any type of touch sensing layers or technology as described herein.

The method (200) may include, with the touch control module (110) executed by the processing device (105), presenting (210) a plurality of navigation buttons at the location of the detected touch. As described herein, the navigation buttons may include a first direction advancement button, a second direction advancement button, a select button, a back button, a forward button, an exit button or combinations thereof. In an example, the navigation buttons may be presented at a location on the bezel closest to the detected touch at the bezel.

Although the present specification describes the presentation of the OSD (115) via a touch of the bezel, alternative options may also be provided besides or in addition to a detected touch at the bezel. Such alternatives may include an actuation of a hotkey action performed on a keyboard associated with the touch display device. In a specific example, a user may actuate the hotkey instead of touching the bezel and, according to any preconfigured OSD (115) location data, the OSD (115) may be presented. As described herein, the touch control module (110) may receive input at the OSD indicating that the OSD is to be repositioned on the screen of the display device. This may be done via actuation or selection of the OSD (115) repositioning button or option as described herein. Similarly, the touch control module may receive input at the OSD indicating that the navigation button is to appear at a specific location on the bezel regardless of the location on the bezel the touch is subsequently detected on the bezel.

The method may include presenting (215) the OSD on a screen of the display device along an edge of the display device closest to that detected touch at the bezel. In an example, the touch control module (110) may map the touch from the user to a nearest location on the screen using x- and y-coordinate data. By placing the OSD along an edge of the touch display device (100) the OSD may be prevented from blocking any images or text being displayed as well as present the OSD (115) at a location closest to where the user touched the bezel. Where the touch used to initiate the OSD is on the bezel, by placing the OSD closest to the location where the user touches the bezel provides immediate access to the OSD where the user's hand is located. In any example presented herein, the OSD (115) may be moved by the user after initiation to another location on the touch display device (100) by using, for example, a drag and drop action.

The method (200) may also include disabling input, via execution of the touch control module (110), to a computing device associated with the display device (100) when touches are sensed at the OSD (115). This specific example may apply to the use of touch display devices which receive input at the screen of the display device as input to a processor of a computing device. In this example, the touch control module (110) intercepts all input at the display device (100), may analyze it, and determine whether that touch was at the OSD (115) or another location beyond the boundary defined by the OSD (115). Where the touch is detected as being within the boundary defined by the OSD (115), the touch control module (110) may cause the processor to adjust the characteristics of the images and/or text presented on the display device (100). The OSD (115) may be navigated using any number of menu options and/or sub-menu options. One of these menu and/or sub-menu options may include an exit option to close the OSD (115) removing the OSD (115) from being presented to the user. When this occurs, the touch control module (110) may reestablish the ability for the input from the display device (100) to be sent to, for example, a processor of a computing device communicatively coupled to the touch display device (100).

Figure 3:
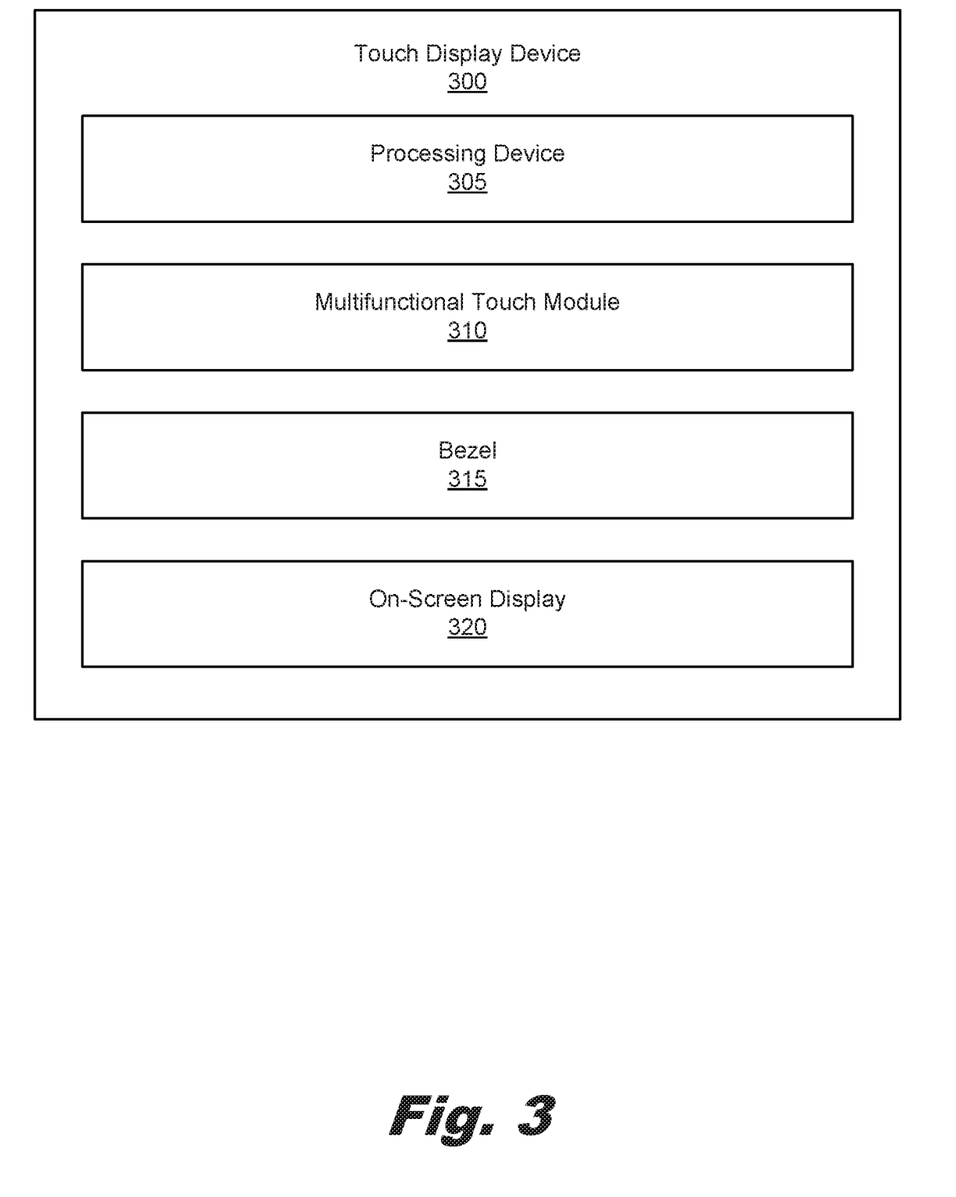
FIG. 3 is a block diagram of a touch display device according to an example of the principles described herein.

FIG. 3 is a block diagram of a touch display device (300) according to an example of the principles described herein. The touch display device (300) may be any device that displays any image or text while also receiving input on a surface (i.e., screen) the images or text are being displayed. In order to receive input at the touch display device (300), the touch display device (300) may have a layer on the surface that may detect a touch. Some examples of the layer may incorporate resistive, acoustic, capacitive, surface capacitive, projected capacitive, self-capacitive, and infrared technologies, among others. Each of these technologies may detect a touch from a user or a tool implemented by a user and, based on the location of the touch on the touch display device (300), provide input to a processing device (305). In any example presented herein, however, the touch display device (300) may instead be a display device that does not receive input via the screen interface as described herein. The present specification, therefor, contemplates that the present methods, processes, and/or devices may be used in connection with a non-touch display device as well as described herein.

The processing device (305) may be any type of processing device (305) that may receive input from a user via the touch display device (300) and act on that input by executing computer readable program code. In an example, the processing device (305) may be physically placed within the housing of the touch display device (300). In an example, the processing device (305) may be communicatively coupled to the touch display device (300) and physically located at a computing device associated with the touch display device (300). In an example, the touch display device (300) may include a processing device (305) and a computing device associated with the touch display device (300) may also include a processing device (305). In this example, the two processing devices (305) may cooperate in order to accomplish the functionality of the touch display device (300) as described herein.

The touch display device (300) or the display device (100) described in connection with FIG. 1, as mentioned, may be communicatively coupled to a computing device in order to receive data descriptive of images and/or text to be displayed by the touch display device (300) or display device (100). Examples of these computing devices may include servers, desktop computers, laptop computers, personal digital assistants (PDAs), mobile devices, smartphones, gaming systems, and tablets, among other electronic devices.

The touch display device (300) or display device (100) and computing devices described herein may be utilized in any data processing scenario including, stand-alone hardware, mobile applications, through a computing network, or combinations thereof. Further, the touch display device (300) or display device (100) and computing devices may be used in a computing network, a public cloud network, a private cloud network, a hybrid cloud network, other forms of networks, or combinations thereof.

To achieve its desired functionality, the touch display device (300) or display device (100) may also include or be associated with various hardware components. Among these hardware components may be the processing device (105, 305), a number of data storage devices, a number of peripheral device adapters, and a number of network adapters, and any number of data communication links to, for example, the computing device as described herein. These hardware components may be interconnected through the use of a number of busses and/or network connections. In one example, the processing device (105, 305), data storage device, peripheral device adapters, and a network adapter may be communicatively coupled via a bus.

The processing device (105, 305) may specifically include the hardware architecture to retrieve executable code from the data storage device and execute the executable code. The executable code may, when executed by the processing device (105, 305), cause the processing device (105, 305) to implement the functionality of detecting a touch from a user at the touch display device (300) or display device (100); presenting an on-screen display (OSD) on the touch display device (300) or display device (100) along an edge of the touch display device (300) or display device (100) closest to that detected touch; presenting a navigation button on the bezel, and/or, with a touch control module (110), disabling input to a computing device associated with the touch display device (300) or display device (100) when touches are sensed at the OSD (115), according to the methods of the present specification described herein. In the course of executing code, the processing device (105, 305) may receive input from and provide output to a number of the remaining hardware units.

The data storage device may store data such as executable program code that is executed by the processing device (105, 305). In an example, the data storage device may specifically store computer code representing a number of applications that the processing device (105, 305) executes to implement at least the functionalities described herein. The data storage device may include various types of memory modules, including volatile and nonvolatile memory. For example, the data storage device of the present example includes Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device, either within the touch display device (300) or display device (100) or a computing device associated with touch display device (300) or display device (100), may be used for different data storage needs. For example, in certain examples the processing device (105, 305) may boot from Read Only Memory (ROM), maintain nonvolatile storage in the Hard Disk Drive (HDD) memory, and execute program code stored in Random Access Memory (RAM).

The hardware adapters in the touch display device (300) or display device (100) may enable the processing device (105, 305) to interface with various other hardware elements, external and internal to the touch display device (300) or display device (100). For example, the peripheral device adapters may provide an interface to input/output devices, such as, for example, a mouse, or a keyboard as well as a computing device communicatively coupled to the touch display device (300) or display device (100). The peripheral device adapters may also provide access to other external devices such as an external storage device, a number of network devices such as, for example, servers, switches, and routers, client devices, other types of computing devices, and combinations thereof.

In the specific example shown in FIG. 3, the touch display device (300) or display device (100) may include a multifunctional touch module (310). In an example, the multifunctional touch module (310) may be computer readable program code that, when executed by the processing device (305), detects a touch by a user at a bezel surrounding the touch display device (300) and presents an on-screen display (OSD) on the touch display device. In another example, the multifunctional touch module (310) may be in the form of an application specific integrated circuit that is communicatively accessible by the processing device (305). In either example, the touch of a user at the bezel may cause the multifunctional touch module (310) to disable input presented to, for example, a computing device associated with the touch display device (300). In an example, all touches detected on the screen apart from those interacting with text and/or images associated with the OSD that has been presented to the user by the multifunctional touch module (310) may be prevented from being passed onto a processor of a computing device.

By way of an example, a user may, with the touch display device (300), cause text and images related to a website to appear on the touch display device (300) through interaction of the computing device communicatively coupled to a computing device. This may be done via execution of a web browsing application by the computing device. When the user attempts to access the OSD by touching any portion or surface of the bezel, the multifunctional touch module (310) may detect that touch at the bezel using any touch sensitive technology described herein. When that touch is detected, the OSD may be presented to the user at any location on the viewable and touchable surface of the touch display device (300). In any example described herein, the multifunctional touch module (310) may detect the touch and map onto the screen of the display device (300) the OSD at a location closest to the location on the bezel where the touch was detected. In these examples, the bezel may be illuminated using any type of illumination device so as to present to the user a number of soft-key navigation buttons. Example soft keys may include a first direction advancement button, a second direction advancement button, a select button, a back button, a forward button, an exit button, or any other button that may allow a user to interact with the OSD being displayed on the screen of the touch display device (300). By allowing the user to touch anywhere on the bezel in order to interact with the OSD, the OSD may be placed at a location on the screen that is most comfortable and usable by the user. Indeed, unlike fixed hard keys, the soft keys and OSD described herein may allow the user to better customize the experience the user has with the touch display device or any other display device.

In an example, the boundary of the OSD may be defined by the processing device (305) so as to demark those areas where input to the OSD may be received via, for example, the screen of the touch display device and where it is not received. In some examples, all touches on the touch display device (300) other than those within the boundary defined by the OSD are prevented, by the multifunctional touch module (310), from being passed onto a processor of a computing device as input. In separate examples, the multifunctional touch module (310) may determine where the touch is being presented on the screen of the touch display device and selectively allow and prevent touches from reaching the processor of the computing device.

As described herein, the OSD is presented to the user at a location closest to the location on the bezel the user touched. Other examples exist, however, that include user-defined locations where the OSD may be presented to the user on the touch display device (300) and the present specification contemplates those locations. By way of example, a user may touch a certain location on the bezel and the OSD may be displayed in a predefined and/or user-defined location on the screen. Again, this allows a user to better customize the user's experience with the display device. Regardless of the location of the OSD, however, the illuminated navigation soft keys may be presented on the bezel where the user touched the bezel.

In an example associated with the touch display device (300), after the OSD has been displayed to the user, any touch detected by the multifunctional touch module (310) at locations other than those beyond the boundaries where the OSD is displayed is intercepted by the processing device (305) via execution of the multifunctional touch module (310). This may be done so that the input is not received by a processor such as the processor of the computing device. By doing so, this may prevent the user from interacting with any other image or text displayed on the touch display device (300) until the OSD is no longer displayed.

In another example associated with the touch display device (300), any touch detected by the multifunctional touch module (310) at locations beyond the boundaries defining the OSD is being displayed is intercepted by the processing device (305) via execution of the multifunctional touch module (310). In this example, those detected touches may be allowed to be passed onto the processing device of the computing device. This may be done, in this example, so that those touches may be used as input to interact with aspects of the website being displayed per this example. This may allow a user to continue to interact with the text and images displayed by a computing device while also interacting with those menu items represented by the OSD to the user.

In another example associated with the touch display device (300), the input received at the OSD by the user may be intercepted by the multifunctional touch module (310) such that any images or data covered by the OSD are not interacted with. In this example, the user may, therefore, be prevented from interacting with any image or text displayed on the touch display device (300) and covered by the OSD until the OSD is no longer presented on the touch display device (300) or at that location of the touch display device (300). In an example, a user may interact with that text and data covered by the OSD by moving the OSD via, for example, a drag and drop process. In this example, the OSD may be presented to the user as slightly transparent so that the images and text underneath the OSD are distinguishable. In other examples, the user may exit the OSD by accessing an exit function. In this example, the OSD is not longer displayed to the user and any touches detected at the touch display device (300) may serve as input to be presented to a processor of a computing device.

In an example, the OSD may be presented to the user using the touch surface of the touch display device (300) rather than the bezel. Because the touch display device (300) is presenting to the user actionable images and text that, when touched, cause an interaction with that image and/or text, the touch used to display the OSD may be distinct. As used in the present specification and in the appended claims, the term "distinct touch" is meant to be understood as any touch at the surface of the touch display device (300) that is distinguishable by the multifunctional touch module (310) as not being a touch used to interact with images and/or text presented to the user from the execution of a processor on a computing device. These images and/or text presented to the user are different from the OSD as a result of the source of the data used to create the images and/or text. In an example, the source of the data for the images and/or text is a processor of a computing device communicatively coupled to the touch display device (300). Instead, the distinct touch may be that which the multifunctional touch module (310) interprets to be a request to display the OSD. Such a distinct touch may include a series of timed touches, a plurality of concurrent touches by any number of fingers of the user on the touch display device (300), and/or touches detected at specific locations on the touch display device (300).

In an example, the OSD may be presented to the user using a physical button located on the touch display device (300). This single button may cause the OSD to appear on the touch display device (300) and interaction with the OSD from thereon may be completed by the user touching the touchable surface of the touch display device (300). In this example, the OSD may be exited using the menu options presented on the OSD as described herein. In an example, the button may be an OSD-dedicated button. In an example, the button may be the power button to the touch display device (300). In this example, the multifunctional touch module (310) may detect a short or relatively quicker press to the power button than that used to turn the touch display device (300) off. Thus, instead of turning the touch display device (300) off, a quick press of the power button may be distinguished from a power-off process and the OSD may be presented to the user instead.

As described herein, the OSD may be presented to the user at any location on the touch display device (300). In the example where a bezel touch initiates the OSD, a location on the surface of the touch display device (300) closest to the location along the bezel touch may be the location where the OSD is displayed. In this example, the user may customize the location of the OSD based on the location of the touch on the bezel.

As described herein, other examples exist where the user may cause computer readable program code to be executed so that the user may indicate where the OSD, when activated using any process described herein, is displayed. For example, a user may be presented on an initial OSD display with the option to choose where the OSD is to be displayed every time the OSD is initiated. In another example, the user may implement the drag and drop process described herein to move the OSD to a location where the OSD is to appear regardless of the method of initiation used to have the OSD appear (i.e., regardless of where on the bezel of the display device the user touches).

As a result of the examples described herein, the size of the bezel of the display device (100) may be reduced. Additionally, without hard buttons used to access menu options presented in the OSD, the size of the bezel may be reduced. This reduces the cost of the materials used to form the housing of the display device (100) as well as reduce the number of physical devices that, over time, may become damaged due to regular wear and tear. Additionally, costs may be saved in cabling and printed circuit boards (PCBs) and other hardware associated with the used of physical buttons on the bezel is also eliminated or reduced.

Figure 4:
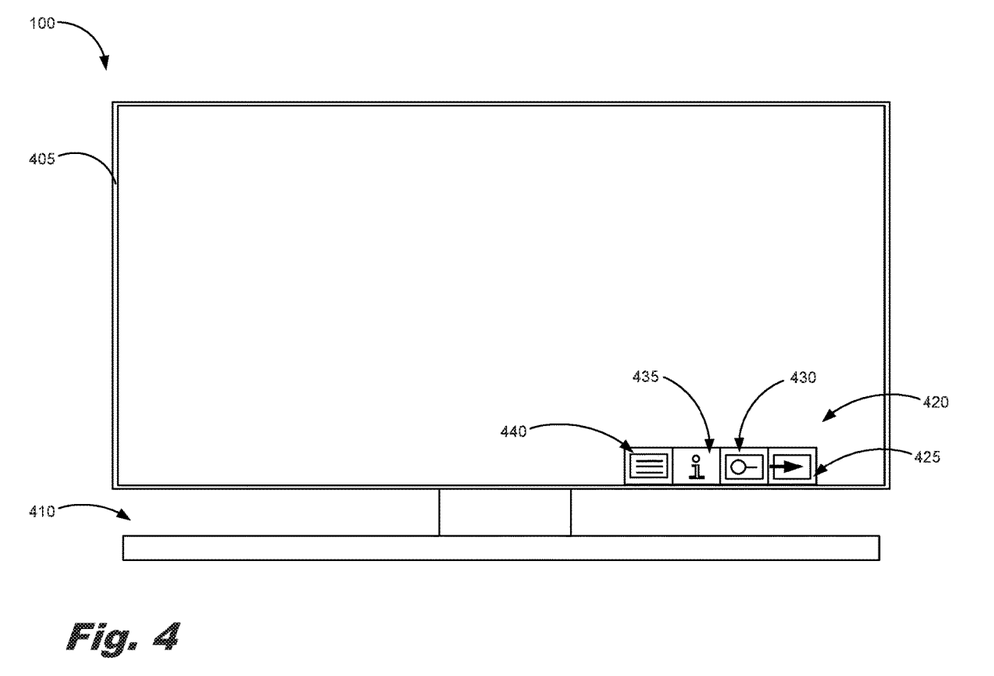
FIG. 4 is a front elevational view of a display device of FIG. 1 according to an example of the principles described herein.
Figure 5:
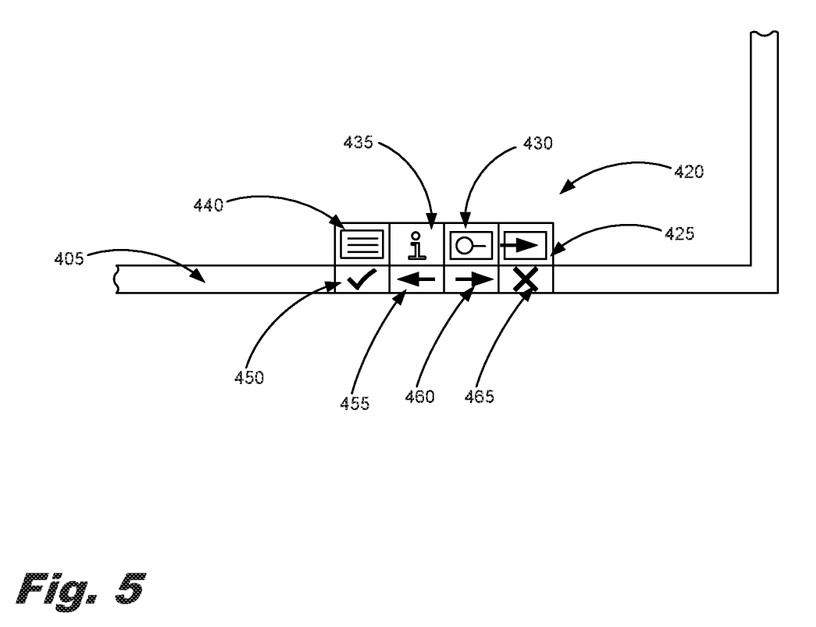
FIG. 5 is a front elevational close-up view of a portion of the touch display device of FIG. 4 according to an example of the principles described herein.

FIG. 4 is a front elevational view of a display device (100) of FIG. 1 according to an example of the principles described herein. The display device (100) may include a bezel (405) and a stand (410). FIG. 4 shows a menu (420) presented on the screen of the display device (100). This menu is an example of part of an OSD that may be presented to a user after the user has touched a place along the bezel or engaged in the distinct touch as described herein. The menu may include an exit button (425), a color adjustment button (430), an information button (435), and a supplemental menu button (440). Although the present example shows specific buttons presented on the display device (100), other examples of different buttons may be used and the present specification contemplates any arrangement and/or different buttons being used in the menu (420). In an example, the bezel (405) may include the navigation buttons (445) in the form of soft keys described herein as shown in FIG. 5. The navigation buttons (445), in this example, may include a select button (450), a back button (455), a forward button (460), an OSD exit button (465). However, the present specification contemplates that other buttons in the form of soft keys may be presented alongside the OSD mapped by the multifunction touch module.

In an example, the exit button (425) presented in the OSD may allow a user to exit the OSD or other sub-menus of the OSD. Upon actuating the exit button (425), the OSD may disappear and the display device (100) may operate as it had prior to initiation of the OSD: receiving touch input from a user related to activities related to the images and text presented to the user (i.e., a website, a word processing application interface, a spreadsheet application interface, and the like). In an example, the OSD exit button (465) presented on the bezel (405) may also serve as an exit for the OSD providing the user of a non-touch screen display device to exit the OSD.

In an example, the color adjustment button (430) may provide a user with the ability to adjust the color, brightness, and/or contrast of the display. When the user actuates this color adjustment button (430), a sub-menu or OSD window may appear extending the footprint of the OSD on the display device (100) and present visual adjustment options.

In an example, the information button (435) may be actuated by the user to reveal additional information about, for example, the make, model, and/or display application version executed by the processing device (105). This information may be presented, again, in an OSD window.

The actuation of the supplemental menu button (440) may present to a user a sub-menu or OSD window that provides any additional options to adjust properties of the touch display device (100) such as energy consumption options, display application update options, and the like.

Each of the color adjustment button (430), information button (435), supplemental menu button (440) may further include a sub-menu exit button or window exit button. The sub-menu exit button or window exit button may allow a user, when actuated, to exit the sub-menu window returning the user to a view of the menu (420) as shown in FIG. 4. Subsequent actuation of the exit button (425), the OSD may disappear thereby exiting the menu (420). Alternative or additionally, the menu (420) may be consistently shown regardless of the presentation of any sub-menu or window. In this example, the exit button (425), when actuated, causes all window or sub-menus as well as the menu (420) to disappear.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processing device (105, 305) of the display device (100) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

Figure 6:
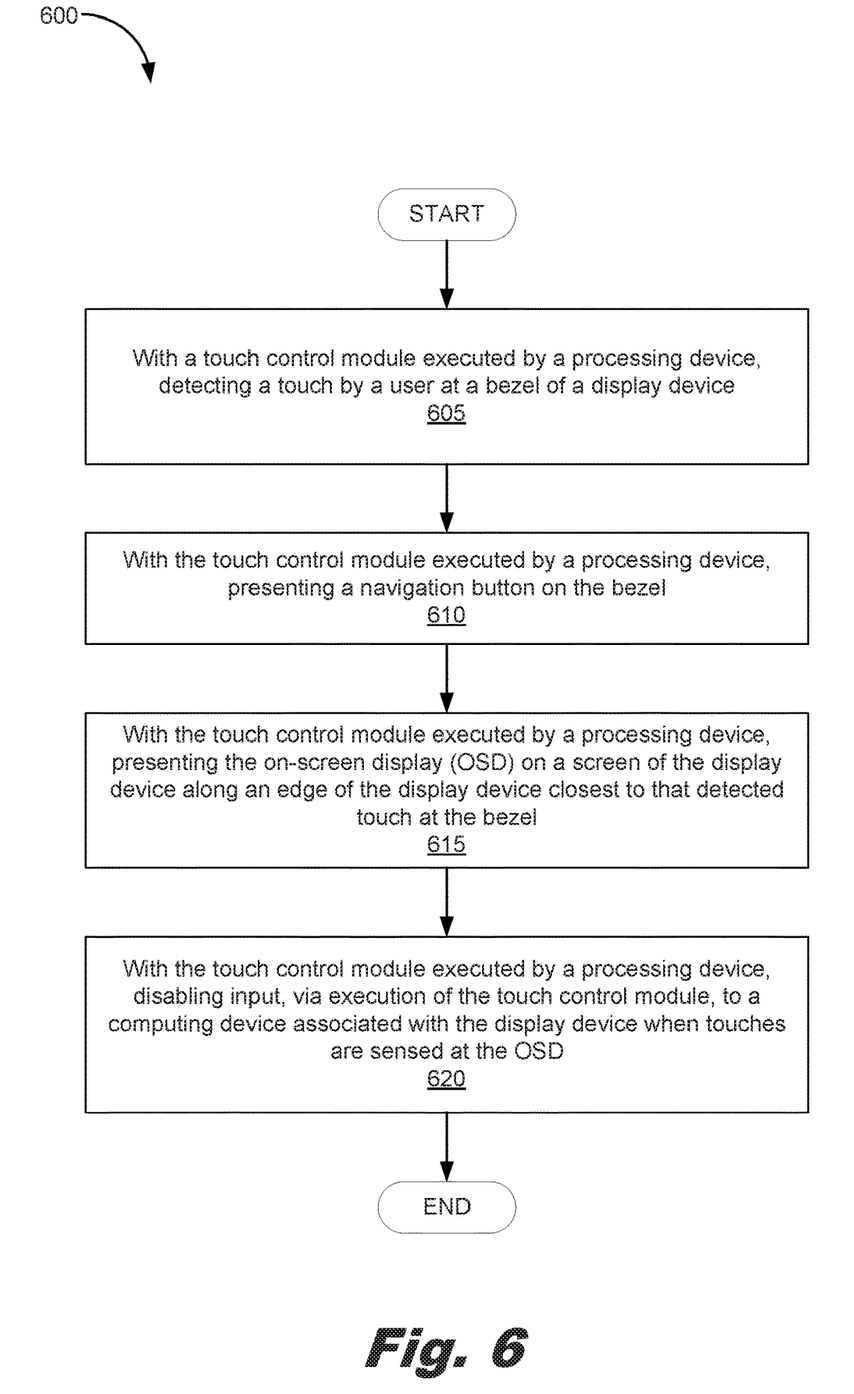
FIG. 6 is a flowchart depicting a method of presenting an on-screen display (OSD) on a display device according to an example of the principles described herein.

FIG. 6 is a flowchart depicting a method (600) of presenting an on-screen display (OSD) on a display device according to an example of the principles described herein. The method (600) may include, with a touch control module (110) executed by a processing device (105), detecting (205) a touch by a user at a bezel of a display device (100). In some examples, the touch control module (110) may detect the touch at the bezel. In another example, the touch control module (110) may detect the touch directly on the surface of the touch display device (100) using any type of touch sensing layers or technology as described herein.

The method (600) may include, with the touch control module (110) executed by the processing device (105), presenting (610) a plurality of navigation buttons on the bezel. As described herein, the navigation buttons may include a first direction advancement button, a second direction advancement button, a select button, a back button, a forward button, an exit button or combinations thereof. In an example, the navigation buttons may be presented at a location on the bezel closest to the detected touch at the bezel.

The method (600) may include presenting (615) the OSD on a screen of the display device along an edge of the display device closest to that detected touch at the bezel. In an example, the touch control module (110) may map the touch from the user to a nearest location on the screen using x- and y-coordinate data. By placing the OSD along an edge of the touch display device (100) the OSD may be prevented from blocking any images or text being displayed as well as present the OSD (115) at a location closest to where the user touched the bezel. Where the touch used to initiate the OSD is on the bezel, by placing the OSD closest to the location where the user touches the bezel provides immediate access to the OSD where the user's hand is located. In any example presented herein, the OSD (115) may be moved by the user after initiation to another location on the touch display device (100) by using, for example, a drag and drop action.

The method (600) may also include disabling (620) input, via execution of the touch control module (110), to a computing device associated with the display device when touches are sensed at the OSD (115). This specific example may apply to the use of touch display devices which receive input at the screen of the display device as input to a processor of a computing device. In this example, the touch control module (110) intercepts all input at the display device (100), may analyze it, and determine whether that touch was at the OSD (115) or another location beyond the boundary defined by the OSD (115). Where the touch is detected as being within the boundary defined by the OSD (115), the touch control module (110) may cause the processor to adjust the characteristics of the images and/or text presented on the display device (100). The OSD (115) may be navigated using any number of menu options and/or sub-menu options. One of these menu and/or sub-menu options may include an exit option to close the OSD (115) removing the OSD (115) from being presented to the user. When this occurs, the touch control module (110) may reestablish the ability for the input from the display device (100) to be sent to, for example, a processor of a computing device communicatively coupled to the touch display device (100).

The specification and figures describe a display device that presents an OSD to a user without the use of hard keys formed on the housing of the touch display device. In certain examples, the bezel may be touched in order to bring up the OSD while in other examples, a distinct touch on the touch display device itself may initiate the OSD. In either example, a touch control module (110) may determine which touches are to be determined to be actuation of certain portions on the OSD or otherwise. If the actuation of certain portions of the touch display device is not within a boundary defined by the OSD, the multifunctional touch module may be set to either allow or disallow that input to be sent to a computing device associated with the display device. By removing any hard-key buttons from the bezel of the touch display device, the physical size of the touch display device may be reduced. Additionally, any hardware associated with the hard-keys placement may be removed lowering the cost of the display device as well as additional parts that may fail due to wear and tear.

The preceding description has been presented to illustrate and describe examples of the principles described. This description is not intended to be exhaustive or to limit these principles to any precise form disclosed. Many modifications and variations are possible in light of the above teaching.

What is claimed is:

1. A display device, comprising:
a processing device;
a touch control module to, when executed by the processing device:
detect a touch at a bezel of the display device;
present a plurality of navigation buttons on the bezel of the display device at a location of the detected touch; and
display an on-screen display (OSD) upon detection of the touch, wherein the plurality of navigation buttons comprises an OSD relocation button to, when activated, cause the OSD to be relocated on the display device.

2. The display device of claim 1, wherein the touch control module maps a location of the detected touch on the bezel and presents the OSD on a portion of the display device closest to the location of the detected touch at the bezel.

3. The display device of claim 1, wherein the navigation buttons comprise a first direction advancement button, a second direction advancement button, a select button, a back button, a forward button, an exit button or combinations thereof.

4. The display device of claim 1, wherein options associated with the OSD may be navigated to using the plurality of navigation buttons.

5. The display device of claim 1, wherein the relocation of the OSD causes the OSD to appear at that location upon subsequent detect touches at a bezel.

6. The display device of claim 1, wherein the plurality of navigation buttons comprises a navigation button relocation button that, when actuated, allows a user to determine where on the bezel the navigation buttons are to appear regardless of the location where the user touches the bezel in a subsequent bezel touch.

7. A method of activating an on-screen display (OSD), comprising:
 with a touch control module executed by a processing device:
  detecting a touch by a user at a bezel of a display device;
  presenting a navigation button on the bezel, wherein the navigation button is an OSD relocation button;
  presenting the OSD on a screen of the display device along an edge of the display device closest to that detected touch at the bezel;
  executing an operation responsive to a detected touch along the bezel at the navigation button; and
  relocating the OSD on the screen responsive to activation of the OSD relocation button.

8. The method of claim 7, wherein presenting a navigation button on the bezel comprises presenting the navigation button closest to the detected touch at the bezel.

9. The method of claim 8, wherein the touch detected by the touch control module is from a hotkey action performed on a keyboard associated with the touch display device.

10. The method of claim 7, wherein the touch control module receives input at the OSD indicating that the OSD is to be repositioned on the screen of the display device.

11. The method of claim 7, wherein the touch control module receives input at the OSD indicating that the navigation button is to appear at a specific location on the bezel regardless of the location on the bezel the touch is subsequently detected on the bezel.

12. A touch display device, comprising:
 a processing device;
 a multifunctional touch module to, when executed by the processing device:
  detect a touch by a user at a bezel surrounding the touch display device;
  present a plurality of navigation buttons on the bezel of the display device at a location of the detected touch, wherein the plurality of navigation buttons comprises an on-screen display (OSD) relocation button;
  present the OSD on the touch display device;
  intercept an input at the display device and prevent passage of the input to a processor of a computing device associated with the touch display device when sensed touches at the OSD are detected; and
  relocate the OSD on the touch display device responsive to activation of the OSD relocation button.

13. The touch display device of claim 12, wherein the multifunctional touch module enables touches to be sent to the computing device detected beyond a boundary defined around the OSD.

14. The touch display device of claim 12, wherein the OSD is presented at an edge where the touch from the user is detected at the bezel and wherein the OSD is mapped and presented at a location on the touch screen closest to where the touch was detected at the bezel.

15. The method of claim 7, comprising:
 intercepting an input at the display device;
 preventing passage of the input, via execution of the touch control module, to a computing device associated with the display device while transmitting touch input sensed at the OSD to the processing device of the display device.

16. The method of claim 15, wherein the display device is a touchscreen display device and wherein the touch control module defines the boundaries of the OSD presented on the touchscreen display device.

17. The method of claim 16, wherein preventing passage of input to a computing device associated with the display device comprises disabling all input received at a location beyond the boundaries of the OSD while allowing touch input received at a location within the boundaries of the OSD.

18. The method of claim 7, wherein detected touch by the user at the bezel of the display device comprises a series of timed touches.

19. The method of claim 7, further comprising illuminating a region of the bezel that comprises the navigation buttons.

* * * * *